C. MESTROVICH.
AMBULANCE.
APPLICATION FILED NOV. 13, 1908.
938,496.
Patented Nov. 2, 1909.
2 SHEETS—SHEET 1.
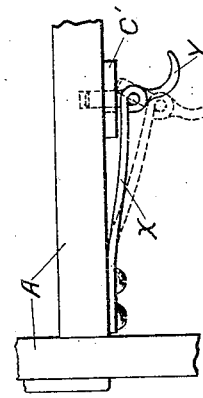
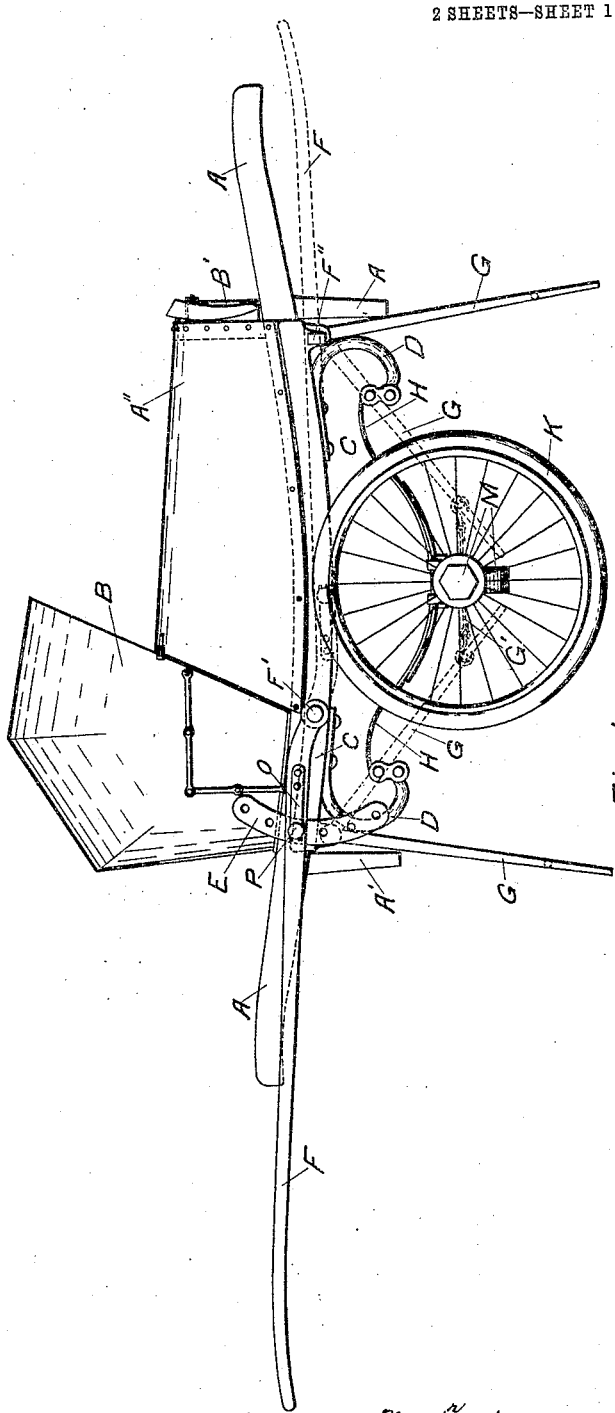
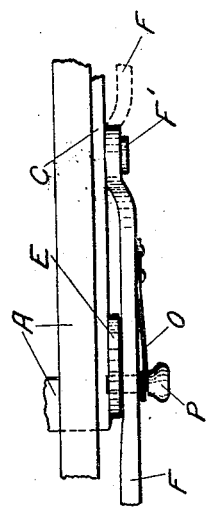
Witnesses.
Ralph Q. Coan
Edward N. Deady
Cristoforo Mestrovich Inventor.
By Brandenburg
Attorneys

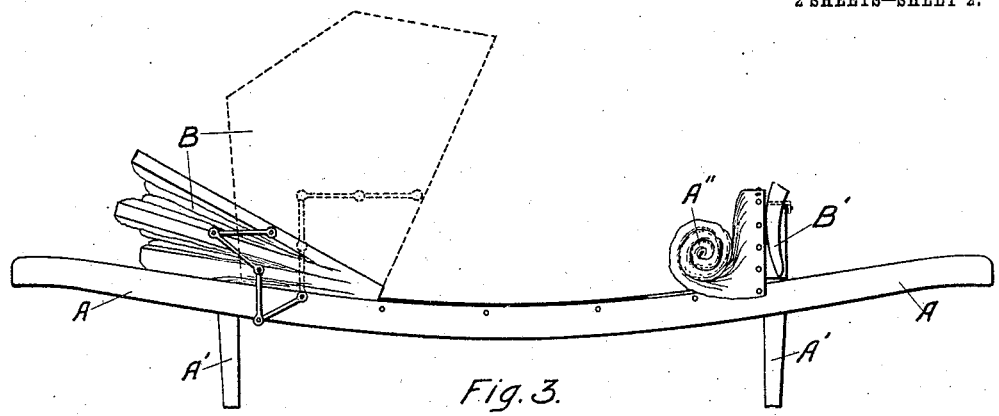
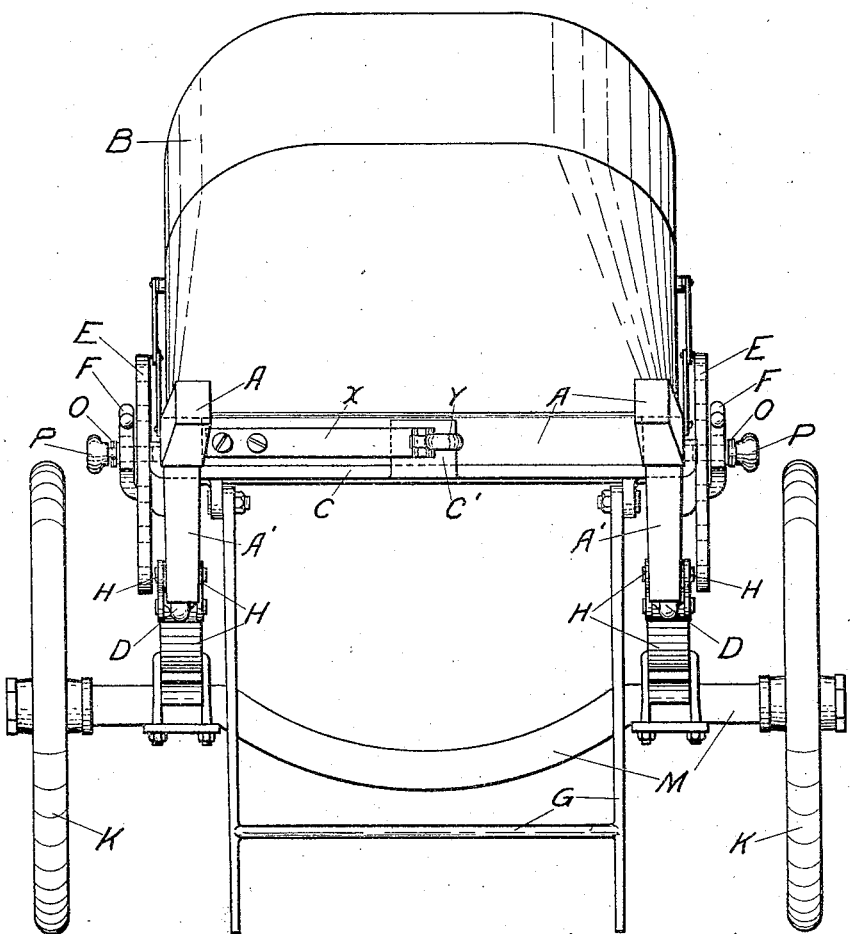

UNITED STATES PATENT OFFICE.

CRISTOFORO MESTROVICH, OF PORTLAND, OREGON, ASSIGNOR TO N. M. MATOSIN, OF PORTLAND, OREGON.

AMBULANCE.

938,496.  Specification of Letters Patent.  Patented Nov. 2, 1909.

Application filed November 13, 1908. Serial No. 462,533.

*To all whom it may concern:*

Be it known that I, CRISTOFORO MESTROVICH, a citizen of Austria-Hungary, residing at Portland, in the county of Multnomah and State of Oregon, have invented a new and useful Ambulance, of which the following is a specification.

My invention relates to an improvement in ambulances whereby the injured may be readily removed with or without the aid of a horse, and wherein the litter or stretcher may be quickly removed for independent use or may remain a part of the ambulance proper.

The construction is strong, yet sufficiently light that only one animal will be required to convey the same over ordinarily rough country. In the event that an animal is not available, two men may propel the same.

One of the ideas of the inventor is to make a light and convenient means of quickly transporting the injured to a proper place for treatment.

I attain these objects by a vehicle illustrated in the accompanying drawing in which—

Figure 1 is a side elevation of the complete invention. Fig. 2 a front elevation of same, and Fig. 3 is a side elevation of the litter or stretcher removed from the carriage, and Figs. 4 and 5, parts of the detail thereof which will be described later.

Similar letters refer to similar parts throughout the several views.

A is the main frame of the litter or stretcher upon which is placed a folding cover, or top B provided with suitable ribs and braces to enable same to be quickly raised or lowered without removing it from the litter or stretcher. Attached to the frame A is a suitable medium to form a proper bed or support wherein the injured may be carried. Attached to frame A are suitable legs A' for resting the frame or litter on the ground. To the rear part of frame A is attached in a suitable manner a canvas cover or roll A'' which extended to the top B as shown in Fig. 1 forms a complete cover and protection for the occupant. Adjoining A'' to the rear is a well equipped emergency case B' for use in giving first aid to the injured. The fittings of the stretcher just described are so constructed as to be readily removed, cleaned, and rendered aseptic.

In Fig. 1, C is the supporting frame of the carriage to which the litter, just described, is attached, and to which the curved support D, the springs H firmly fastened to the curved axle M ending in wheels K, are properly secured. The legs G pivoted by bolts to frame C are elevated and held in suspension when the carriage is in motion by means of appropriate hooks and strap G', but readily dropped when at rest to evenly support the litter and carriage in proper position.

The shafts F intended for use with an animal, but which may be used as handles, are attached to the frame C by means of bolts F' and held in proper alinement or at any level desired by means of the quadrants E supplied with appropriate holes into which the spring pins P are inserted. The spring pin P is shown in detail in Fig. 4, F being the section of shaft F', the bolt pivoting same to the carriage frame C and O the spring, the elasticity of which, holds the pin P in position in quadrant E.

The litter previously described is held to the carriage C by means of a special fastener shown in Fig. 5, X being a spring secured to the litter frame A and carrying at its outer end, a pin with handle Y, traction upon which releases plate C', which is an integral part of frame C, from the litter frame A, allowing the litter to be raised out of its seat. The dotted lines show position when pin is withdrawn.

I am aware that prior to my invention, ambulances have been made having hand litters in connection therewith. I therefore do not claim such a combination broadly, but,

I claim,

In an ambulance, a litter comprising, in part, a frame, a supporting-carriage for said litter, comprising, in part, a frame, a vertically-disposed, perforated plate carried by said carriage-frame, a leaf-spring carried by said litter-frame, and a pin carried by the outer end of said spring and projecting through the perforation in said plate and engaging with said litter-frame, removably to lock the same to said carriage-frame.

CRISTOFORO MESTROVICH.

Witnesses:
 RALPH A. COAN,
 L. ESSIE GARD.